US006230011B1

(12) United States Patent
Guenther et al.

(10) Patent No.: US 6,230,011 B1
(45) Date of Patent: May 8, 2001

(54) METHOD OF DETERMINING TRAFFIC DATA BY MEANS OF MOBILE RADIO TELEPHONES

(75) Inventors: Bernd Guenther, Niederkassel; Roland Kuenzel, Puchheim, both of (DE)

(73) Assignee: Detemobil Deutsche Telekom Mobilnet GmbH, Bonn (DE)

( * ) Notice: Subject to any disclaimer, the term of this patent is extended or adjusted under 35 U.S.C. 154(b) by 0 days.

(21) Appl. No.: 09/147,873

(22) PCT Filed: Sep. 18, 1997

(86) PCT No.: PCT/DE97/02099

§ 371 Date: Jun. 1, 1999

§ 102(e) Date: Jun. 1, 1999

(87) PCT Pub. No.: WO98/12683

PCT Pub. Date: Mar. 26, 1998

(30) Foreign Application Priority Data

Sep. 18, 1996 (DE) ..................... 196 38 070

(51) Int. Cl.[7] ..................... H04B 7/00

(52) U.S. Cl. ..................... 455/432; 455/422; 455/456

(58) Field of Search ..................... 455/432, 422, 455/433, 435, 458, 445, 450, 550, 575, 456, 457

(56) References Cited

FOREIGN PATENT DOCUMENTS 196 04 084 * 2/1996 (DE) .
2273424 * 6/1994 (GB) .
WO 96/25830 * 8/1996 (SE) .

* cited by examiner

*Primary Examiner*—Thanh Cong Le
(74) *Attorney, Agent, or Firm*—Cooper & Dunham LLP

(57) ABSTRACT

A method for acquiring traffic data from vehicles equipped with at least one decentralized unit having at least one function for mobile communication a second function for obtaining time information and a third function for data storage. At least one central unit with control functions and processing functions assigned to a plurality of decentralized units, wherein decentralized unit receives and evaluates information characterizing radio cells, and other technical radio and transmission information and information which characterizes cell changeover is recorded together with time stamps.

4 Claims, 1 Drawing Sheet

METHOD OF DETERMINING TRAFFIC DATA BY MEANS OF MOBILE RADIO TELEPHONES

FIELD OF THE INVENTION

This invention relates to a method for acquiring traffic data in which a mobile communication system is used, said communication system being used both for the transmission of information and for the purpose of position determination.

BACKGROUND OF THE INVENTION

Methods for acquiring traffic data which make use of stationary acquisition sensor systems are known. Furthermore, first approaches have been published in respect of mobile traffic data acquisition by means of expensive devices in the vehicle, for example with the assistance of digital maps.

WO-A-95/25830 discloses a position finding system for a mobile station of a cellular mobile radio network, the position of the mobile station being determined by the evaluation of information which characterizes cells, and propagation delay measurements.

GB-A-2 273 424 discloses a method for carrying out a hand-off in a cellular mobile radio system, in which case, using information which characterizes cells and is received by the mobile station, the location of the mobile station and thus the instant for a cell changeover are estimated and the hand-off is initiated when the cell boundary is reached.

SUMMARY OF THE INVENTION

The object of the invention is to minimize the outlay in the vehicle and, in particular, to specify a cost-effective solution for mass-market applications.

What is advantageous about the invention is the fact that very little outlay has to be implemented in the terminals in order to achieve a result which is attractive for mass-market applications.

The object of the present invention is achieved by providing a method for acquiring traffic data from vehicles equipped with at least one decentralized unit having at least one function for mobile communication, a function for obtaining time information and a function for data storage, and at least one central unit with control functions and processing functions assigned to a plurality of decentralized units. The method consists of the steps of receiving and evaluating, by the decentralized unit, information characterizing cells of a mobile radio network, technical radio information and transmission information, and recording time stamp information and information characterizing a cell changeover.

The method of the present invention further includes the steps of communicating, to a central station, data gathered in the decentralized units, assigning the communicated data, using the information characterizing the cells and radio coverage information relating to the cells, to geographical information about a routing network, and performing a reconstruction of a route of the vehicle.

The method of the present invention also includes the step of evaluating, with aid of the reconstructed route, the time stamp information from data records communicated to the central station, so as to determine variables characterizing traffic flow on routes.

The method of the present invention also includes the step of communicating to a central station via a mobile communication system, data recorded in the decentralized units.

BRIEF DESCRIPTION OF THE DRAWINGS

The features and advantages of the invention will become apparent upon review of the following detailed description of preferred embodiment, taken in conjunction with the following drawings, in which.

DETAILED DESCRIPTION OF THE PREFERRED EMBODIMENTS

Figure 1:
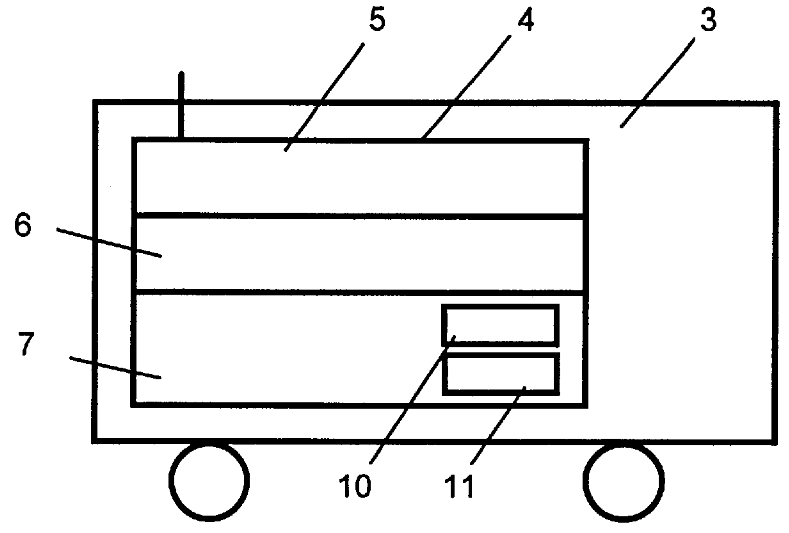
FIG. 1 diagrammatically shows a vehicle equipped with a decentralized unit.
Figure 2:
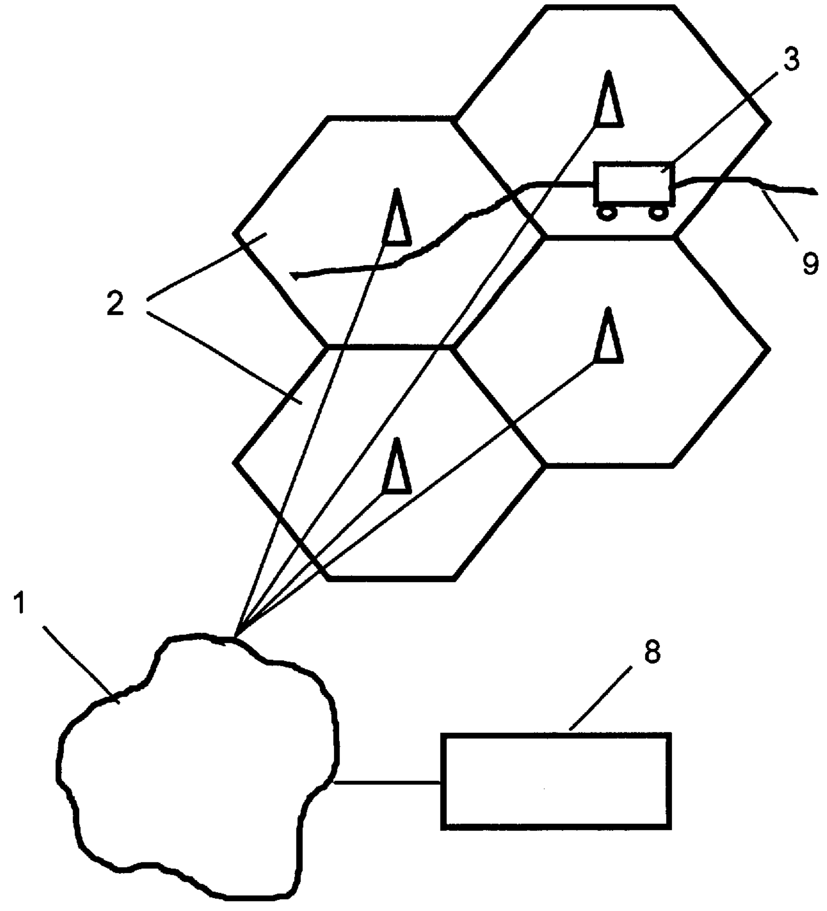
FIG. 2 shows a vehicle moving on a route through cells of a mobile radio network.

In the case of mobile traffic data acquisition by way of radio coverage geometry of a cellular mobile radio network 1, the terminal 4 in the vehicle 3 requires a mobile communication module 5, but not a module for position finding (such as e.g. a GPS receiver). Further prerequisites are a time-measurement module 6 and a storage module 7.

During the journey, the communication module 5 registers itself in the mobile radio network 1. In this case, among other things, the cell identifiers 10 and other technical radio parameters are received and evaluated. The transition from one cell 2 to the next is recorded using the cell identifiers 10 and the transition instant. The recorded data are transmitted to the central station 8 according to specific rules, such as, for example, availability, capacity of the mobile communication medium and/or time and distance criteria, distance traveled, time elapsed since the last message, etc.

On the basis of the data gathered from the vehicle 3 and knowledge of the cell identifiers 10 and also the structure of the radio network 1, the route 9 traveled is reconstructed in the central station 8 using a map. Furthermore, the speed of the vehicle 3 can be determined from the sequence of cell changeovers and the associated time stamps 11 as well as the knowledge of the spatial extent of the radio cells 2. With further features of the radio network 1 being taken into account, such as the identifiers 10 of the neighboring radio cells 2, the signal transit times thereof, the signal strengths thereof, and the signal qualities thereof, a more accurate and more reliable reconstruction of the route 9 is made possible.

The concept of the invention is not limited to the exemplary embodiment described, rather all the features of the subclaims, individually or in any desired combination, are likewise claimed as being associated with the scope of the disclosure of this patent application.

What is claimed is:

1. A method for acquiring traffic data from vehicles including at least one decentralized unit having at least one function for mobile communication a function for obtaining time information and a function for data storage, and at least one central unit with control functions and processing functions assigned to a plurality of decentralized units, said method comprising the steps receiving and evaluating, by the decentralized unit, information characterizing cells of a mobile radio network, technical radio information and transmission information; and recording time stamp information and information characterizing a cell changeover.

2. The method as claimed in claim 1, further comprising the steps of:

communicating, to a central station, data gathered in the decentralized units;

assigning the communicated data, using the information characterizing the cells and radio coverage information relating to the cells, to geographical information about a routing network; and performing a reconstruction of a route of the vehicle.

3. The method as claimed in claim 2, further comprising the step of evaluating, with aid of the reconstructed route, the time stamp information from data records communicated to the central station, so as to determine variables characterizing traffic flow on routes.

4. The method as claimed in claim 1, further comprising the step of communicating to a central station via a mobile communication system, data recorded in the decentralized units.

* * * * *